April 4, 1967 E. T. IRWIN 3,312,225
AUTOMATIC CARD FILING APPARATUS
Filed Oct. 9, 1963 3 Sheets-Sheet 1
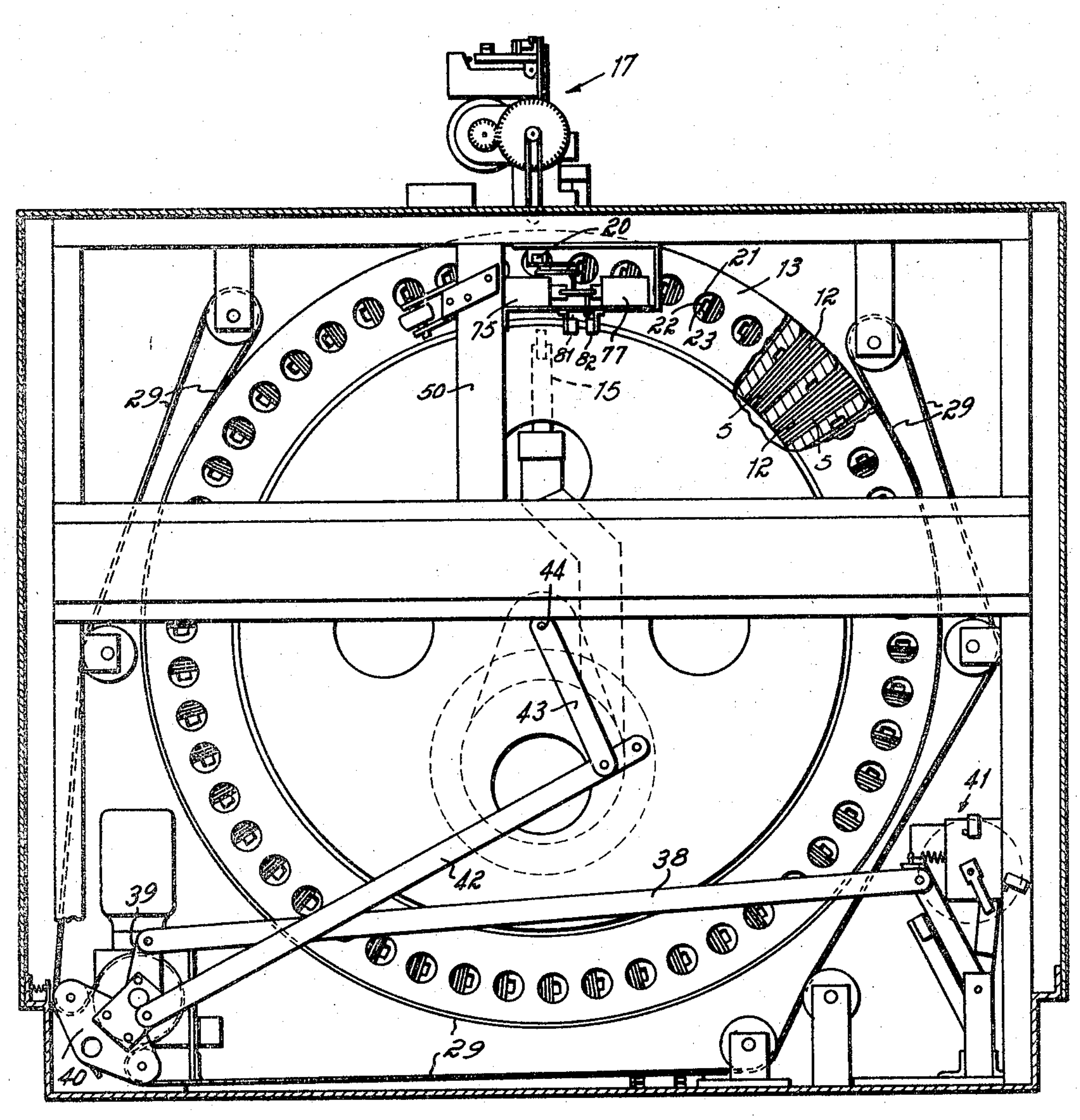
INVENTOR.
Edward T. Irwin
BY
Wood, Herron and Evans
ATTORNEYS April 4, 1967 E. T. IRWIN 3,312,225
AUTOMATIC CARD FILING APPARATUS
Filed Oct. 9, 1963 3 Sheets-Sheet 2
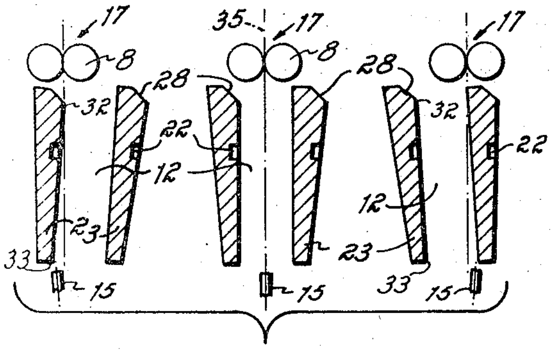
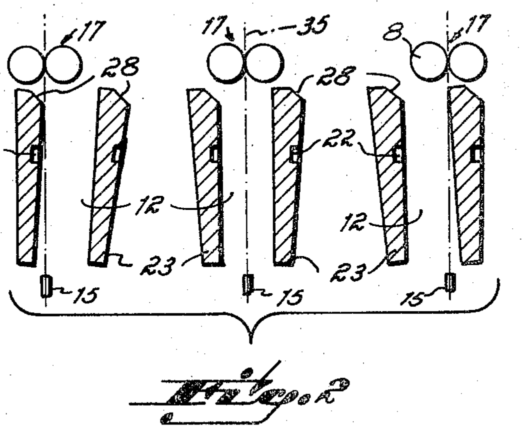
FIG. 3 FIG. 2
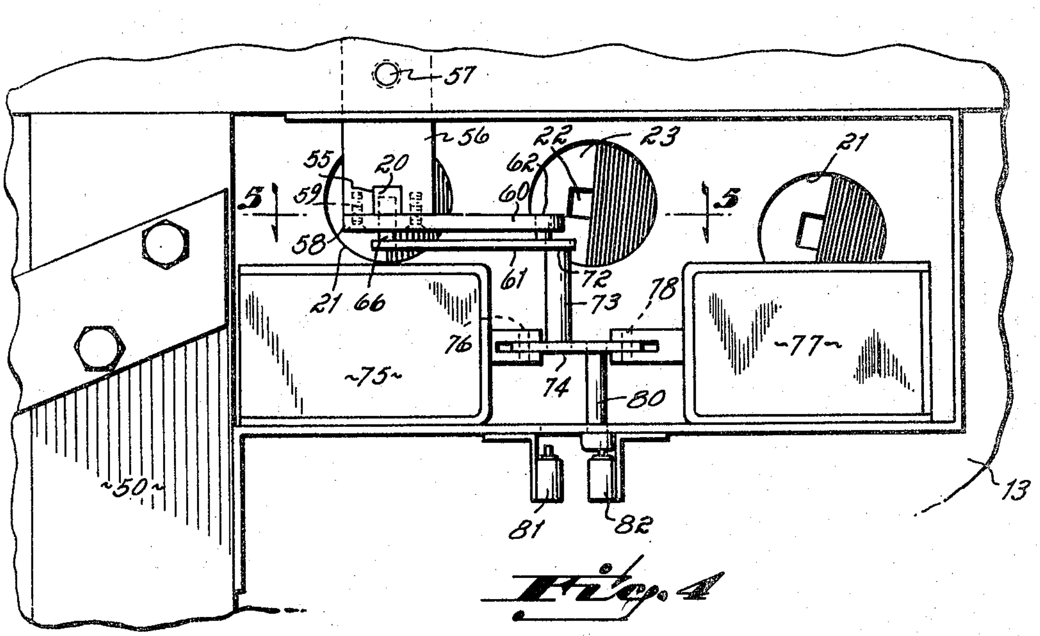
FIG. 4
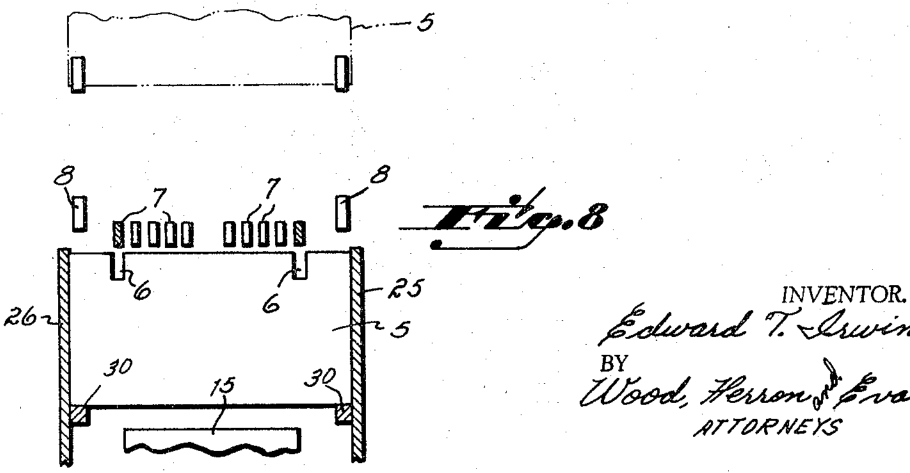
FIG. 8
INVENTOR.
Edward T. Irwin
BY
Wood, Herron and Evans
ATTORNEYS April 4, 1967 E. T. IRWIN 3,312,225

AUTOMATIC CARD FILING APPARATUS

Filed Oct. 9, 1963 3 Sheets-Sheet 3

INVENTOR.
Edward T. Irwin
BY
Wood, Herron and Evans
ATTORNEYS

United States Patent Office 3,312,225
Patented Apr. 4, 1967

3,312,225
AUTOMATIC CARD FILING APPARATUS

Edward T. Irwin, Cincinnati, Ohio, assignor to The Mosler Safe Company, Hamilton, Ohio, a corporation of New York Filed Oct. 9, 1963, Ser. No. 314,960
4 Claims. (Cl. 129—16.1)

Figure 5:
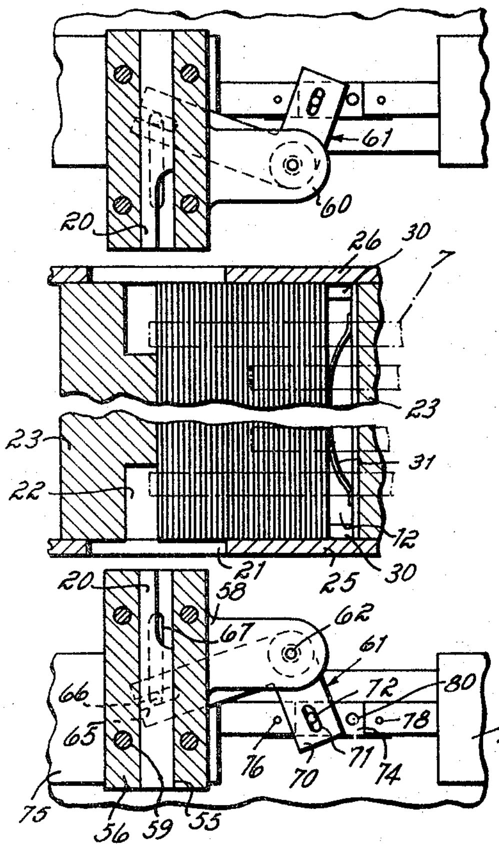

This invention relates to card or information selecting systems and more particularly to a card selecting system in which cards are stored in an indexable filing cabinet from and to which cards automatically and selectively are removable and returnable.

The invention of this application pertains to and is incorporated in an automatic card retrieval system in which a plurality of cards are stored within a card tray in the form of a rotatable filing drum having a plurality of storage pockets or compartments located around its peripheral surface; in this sense therefore the card tray is of the curvilinear type. Cards are removed from the tray at a card selection station located at the top of the drum where the cards rest by gravity and are free for movement from the drum while the cards at lower portions of the drum are restrained and held therein. A selector at the selection station restrains all of the cards except a preselected one against movement while the released card or cards are moved relative to the nonselected cards in the compartment by means of a stream of air furnished from a nozzle arranged within the drum opposite the selector. While the air ejected from the nozzle against the bottoms of the cards urges all of them progressively toward the selector as the cards are moved relatively past it, the predetermined card, having a code corresponding to the code for which the selector has been set is free to move relative to the other card to a position in which it is physically differentiated from them. From this position the predetermined or selected card is removed from the pocket automatically and moved to a viewing or "read out" station from where it is returned to the compartment of the drum from whence it was removed.

It has been an objective of this invention to provide apparatus for automatically returning the card to the file and the compartment from whence it was removed without interference between the returning card and the other cards of the compartment.

One of the primary factors in the determination of card life or replacement frequency is attrition resulting from frictional contact between adjacent cards and card flexure during removal and insertion of the cards from a deck within a compartment. Using the air ejection technique of card removal, attrition is minimized. During return of the card to the drum, flexing and frictional contact should also be avoided. To this end means are provided for establishing a gap between the end wall of the compartment and the last card in the deck into which the card is returned such that there is no interference between the returning card and the other cards of the compartment.

Still another objective of this invention has been to provide means in a curvilinear file operable to maintain the air stream directed against the bottom of a card which has a top edge aligned with a transport mechanism, as for example, friction rollers for removing the card from the file. I have discovered that cards stored within a curvilinear file are not all located in radial planes of the file and that as a consequence a radially directed air stream aimed at a card receiving transport mechanism does not remain directed at the bottom edge of a card which has the top edge aligned with the transport mechanism throughout the scanning of all of the cards of the pocket; i.e., as all of the cards of the pocket are sequentially moved through the air stream. Therefore, it is necessary to compensate for this misalignment so as to maintain the nozzle always directed at the edge of a card which has an opposite edge aligned with the transport mechanism. In the preferred embodiment, I compensate for this misalignment by moving the air nozzle through a small arc in the clockwise direction while the file is moved counterclockwise during the scanning of a pocket and vice versa.

Figure 6:
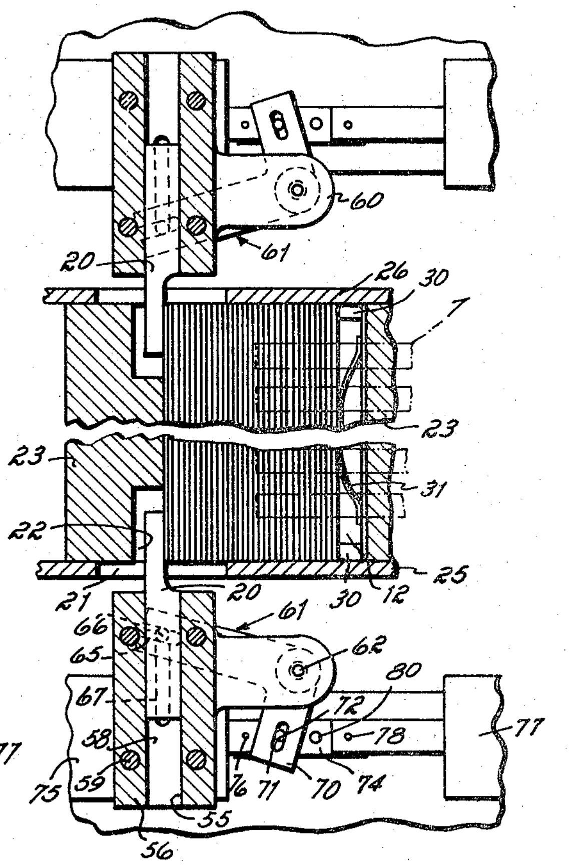
Figure 7:
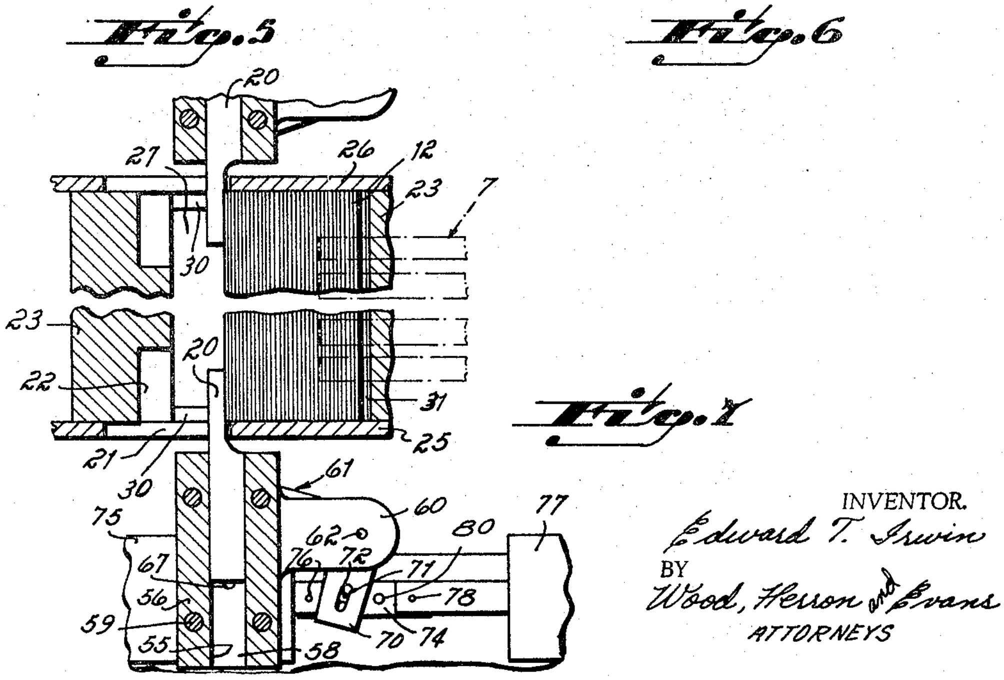

These and other objects and advantages of this invention will be more readily apparent from a description of the drawings in which:

FIGURE 1 is a side elevational view of the card selection apparatus which incorporates the invention of this application, FIGURE 2 is a diagrammatic illustration of a pocket in three different positions relative to the air nozzle illustrating misalignment which occurs as a result of all cards not being located in radial planes of the drum, FIGURE 3 is a diagrammatic illustration of a pocket in three different positions relative to the air nozzle illustrating the misalignment correction, FIGURE 4 is an enlarged side elevational view of a portion of the card compressor mechanism illustrated in FIGURE 1, FIGURE 5 is a cross sectional view taken along line 5—5 of FIGURE 4 showing the compressor fingers in the withdrawn position, FIGURE 6 is a view similar to FIGURE 5 with the compressor fingers in the extended position prior to compression of the deck of cards, FIGURE 7 is a view similar to FIGURE 6 with the drum rotated to a position in which the deck of cards is fully compressed preparatory to return of a card to the file, FIGURE 8 is a diagrammatic cross sectional view of a drum pocket located at the card selection station.

Referring to FIGURES 1 and 8, it will be seen that the machine of this invention is particularly designed for selection of cards 5 which have coded notches 6 along their upper edge engageable with selector fingers 7 to restrain all but a selected one of the cards from removing relative to the pack when exposed to an air stream during the card selecting or scanning portion of the operation cycle. The cards 5 are stored within pockets 12 located around the periphery of a drum 13. In the preferred embodiment of this invention there are 50 pockets, each of which contains 100 cards. The cards may carry information printed, written, typed, punched, or magnetically coated upon the faces thereof or may have apertures within which are mounted microfilm strips adapted to be projected onto a screen or viewed by closed circuit television.

A complete description of the card filing apparatus shown in FIGURE 1 together with its control system may be found in application Ser. No. 279,260 of Robert A. Lasley et al., filed May 9, 1963, now Patent No. 3,225,770 and assigned to the assignee of this application. For a complete description of this machine, that disclosure is hereby incorporated by reference. The invention of this application is disclosed but not claimed in that application so that reference may be had to that application for a complete disclosure of the operating environment of this invention.

Referring to FIGURES 1 and 5, it will be seen that the card file is in the form of a drum 13 which comprises a pair of annular spaced side walls 25, 26 between which the card containing pockets are located at the periphery of the drum. The pockets are formed by spaced divider walls 23, which extend transversely between the side walls 25, 26 and are generally located in radial planes of the drum. In cross section, each divider 23 is of increasing thickness in a direction extending outwardly from the center of the drum so that the pocket formed by the rear wall of one divider 23 and the forward wall of the adjacent divider is rectangular in cross section as may best be seen in FIGURES 2 and 3. The outer edge of each divider is chamfered as at 28 to provide a tapered guide surface for cards as they are returned to the pocket.

A pair of annular rings 30 are attached to each of the plates 25, 26, and serve as bottom supporting surfaces for the cards within a compartment. These rings extend only partially across the width of each pocket such that the remaining area at the bottom of each pocket is open for exposure to a gaseous velocity stream from a nozzle 15 located within the drum.

To select a card from the drum and move it into a viewing position in the transport head 17, the drum is first indexed to locate a selected compartment of the drum in the 12 o'clock position beneath the transport head. When the selected compartment is located in this position, the first card in the deck is located beneath the transport rollers as shown diagrammatically in the first or left view of FIGURE 3. At this time selected ones of the selector fingers 7 move outwardly so as to extend over the selected compartment into a position in which they restrain all but a selected card against upward movement into the drive rolls 8. At this time an orifice gate (not shown) of the nozzle 15 is opened so that an air stream issues from the nozzle. The drum is then rotated through an arc sufficient to pass all of the cards within the selected compartment through the velocity stream of air as shown in the second and third diagrammatic view of FIGURE 3. After all of the cards in the compartment have been exposed to the air stream, the selected card, which is the only one within the compartment properly notched so as to be free to move upwardly, will have entered between the drive rolls 8. The selector fingers are then withdrawn from over the selected card, and it is carried upwardly out of the compartment into the transport head. As soon as the selected card enters between the drive rolls, the drum immediately returns to its zero or starting position in which the first card in the deck is once again located beneath the point of contact of the drive roll; the position shown diagrammatically in the left hand view of FIGURE 3. At this point in the cycle of operation in the selection of a card, compressor fingers 20 (see FIGURES 5 and 6) mounted on the frame 50 of the machine exteriorly of the drum enter through side wall apertures 21 in the plates 25, 26 into notches 22 provided in the front side wall of each of the compartment dividers 23. As soon as the fingers 20 have been moved through the apertures 21 into the interior of the drum, rotation of the drum in the counterclockwise direction occurs through an arc of approximately 2 or 3 degrees. This rotation of the drum causes the cards within the selected compartment to be compressed so that a gap 27 (see FIGURE 7) is provided between the front wall of the compartment and the first card in the deck. To permit the creation of a wide gap 27 between the first card in the pack and the forward divider wall, an elliptical shaped compression spring 31 is preferably located between the last card of the deck and the rear divider wall. After the information on the preselected card has been "read out," the card is returned to the deck by rotating the drive rolls in a direction opposite to that in which they were driven to remove the card from the deck. When so driven, the card is moved downwardly into the gap (27) provided. As soon as the card has been returned to the compartment from whence it was removed, the compressor fingers 20 are withdrawn so that the machine is free to start another card selection cycle. By compressing the deck prior to return of the card to the file, the preselected card may be quickly returned to the drum without interference of the other cards in the pocket.

Referring to FIGURES 4–7, it will be seen that identical compressor fingers are located on opposite sides of the drum 13. Since the fingers as well as the mechanism for operating them are identical, only one will be described in detail.

The compressor finger 20 is slidably mounted within a rectangular groove 55 in the bottom of block 56. Block 56 is rigidly attached to the frame 50 by screws 57. Slidably holding the compression finger 20 within the recess 55 is a retainer bracket 58 secured to the bottom of block 56 by screws 59. The bracket 58 has a flange 60 extending outwardly in the horizontal plane upon which a compressor finger actuating bell crank 61 is mounted. The bell crank 61 is pivotally mounted upon a pin 62. One leg of the crank 61 is longitudinally slotted as at 65 to accommodate a pin 66 depending from each compressor finger 20 and extending through a longitudinal slot 67 of bracket 58. The other leg 70 of the crank 61 has a longitudinal slot 71 therein which accommodates one end 72 of a connecting pin 73. The opposite end of the pin 73 is mounted in a connecting link 74 which is attached at one end to a solenoid 75 by pin 76 and is attached at the opposite end to another solenoid 77 by pin 78. Depending from link 74 is a switch actuating pin 80 operable to actuate either of two switches 81 or 82 depending upon the position of the card compression finger 20.

Upon energization of solenoid 75, link 74 is moved to the left as viewed in the lower portion of FIGURE 5 which results in bell crank 61 being pivoted in the clockwise direction and movement of the compression fingers inwardly to the position shown in FIGURE 6. Energization of solenoid 77 results in movement of the connecting link 74 to the right with resulting counterclockwise movement of the bell crank 61 and an outward movement of the compression fingers 20 returning them to the position illustrated in FIGURE 5.

The machine of this invention also includes means to correct for card misalignment which occurs as a result of the curvilinear shape of the card file or drum. Referring to FIGURE 2 wherein the necessity for misalignment correction is illustrated, it will be seen that the necessity for this correction stems from the geometric construction of the pocket. Specifically, this problem derives from the fact that the center line 35 of each pocket is located on a radius of the drum or curvilinear file, and the walls of the pocket are parallel to it. Of course, the walls should be parallel if the bottom dimension of the pocket is to be the same as the top dimension; a condition prerequisite to the cards not being more compressed at the bottom than at the top. When the drum is rotated to the point where the upper edge 32 of the divider walls and thus the top edge of the card located against the divider is located in the vertical plane of the point of contact between the rollers (which also represents the vertical center line of a pocket in the 12 o'clock position), the inner edge 33 of this same divider wall and thus the bottom edge of the first card is not located in the same vertical plane.

As shown in FIGURE 2, in every position of a pocket except that in which the pocket is perfectly centered on the vertical center line, the card which is being blown upwardly by the air stream is not directed into the drive roll. However, as shown in FIGURE 3, if the nozzle is moved clockwise simultaneously with counterclockwise movement of the pocket and vice versa, the air stream can be directed at the bottom of the card the top edge of which is directed into the drive rolls. Referring to FIGURE 1, the apparatus for moving the nozzle in a direction opposite to that in which the drum is rotated during scanning of the cards within a pocket, includes the link bar 38 which is attached at one end 39 to a rocker arm 40. During scanning of a pocket the arm 38 is caused to reciprocate by a rotary cam and follower mechanism indicated generally at 41. As is explained fully in the above identified co-pending application of Robert A. Lasley et al., movement of the rocker arm 40 causes the belt 29 to move relative to the pulleys upon which it is mounted carrying with it the drum 13 so as to cause the drum to move through an arc in which all of the cards of a pocket are moved over the nozzle 15. A second link bar 42 is connected at one end to the rocker arm 40. At the other end the bar 42 is connected through a third link 43 to the center shaft 44 upon which the drum 13 is rotatably mounted. The nozzle 15 is nonrotatably mounted upon the center shaft 44. Therefore, when the rocker arm is moved in a direction to cause counterclockwise rotation of the drum, the nozzle 15 is moved through the linkage system 42, 43 in a clockwise direction. Thus, the nozzle is moved in a direction during scanning of the pocket opposite to that in which the pocket is moved and the air stream issuing from the nozzle is always directed against the bottom of a card having a top edge aligned with the stationary rollers of the transport mechanism 17.

From the foregoing disclosure of the general principles of the present invention and the above description of a preferred embodiment, those skilled in the art will readily comprehend various modifications to which this invention is susceptible. Therefore, I desire to be limited only by the scope of the following claims.

Having described my invention, I claim:

1. Card selecting apparatus comprising:
a file having at least one pocket of rectangular configuration for receiving and storing a deck of coded cards therein, said pocket being defined by a pair of opposed side walls, a pair of opposed end walls and having two opposed at least partially open sides, said side walls having apertures therein,
means for restraining all but a preselected card against movement relative to the remainder of cards of said deck,
means for directing a velocity stream of gaseous fluid through one of said partially open sides against one edge of said deck as movement is effected between said deck and stream whereby said cards are sequentially moved through said velocity stream and said unrestrained preselected card is moved to a physically discrete position relative to the remainder of cards within said deck.
means adjacent the other of said partially open sides for receiving said preselected card when moved to said physically discrete position and for completely removing said preselected card from said deck, and
means for returning said preselected card to said deck, said last named means including compressor fingers insertable through said side wall apertures for moving said deck away from one of said end walls for establishing a gap between the last card of said deck and said one of said end walls while said card is out of said pocket and means for inserting said preselected card into said gap.

2. Card selecting apparatus comprising:
a file having at least one pocket of rectangular configuration for receiving and storing a deck of coded cards therein, said pocket being defined by a pair of opposed side walls, a pair of opposed end walls nd having two opposed at least partially open sides, said side walls having apertures therein,
means for restraining all but a preselected card against movement relative to the remainder of cards of said deck,
means for directing a velocity stream of gaseous fluid through one of said partially open sides against one edge of said deck as movement is effected between said deck and said stream whereby said cards are sequentially moved through said velocity stream and said unrestrained preselected card is moved to a physically discrete position relative to the remainder of cards within said deck,
means adjacent the other of said partially open sides for receiving said preselected card when moved to said physically discrete position and for completely removing said preselected card from said deck,
compressor fingers insertable through said side wall apertures after said preselected card is removed from said pack,
means for effecting relative movement between said fingers and said file to establish a gap between the last card of said deck and one of said end walls, and
means for inserting said preselected card into said gap.

3. Card selecting apparatus comprising:
a rotary file having a plurality of pockets located around the periphery thereof of rectangular parallelepiped configuration for receiving and storing decks of coded cards therein, each of said pockets being defined by a pair of opposed side walls, a pair of opposed end walls and having two opposed at least partially open sides, said side walls having apertures therein,
means for restraining all but a preselected card against movement relative to the remainder of cards of said deck,
means for directing a velocity stream of gaseous fluid through one of said partially open sides against one edge of a selected deck as movement is effected between said deck and said stream whereby said cards are sequentially moved through said velocity stream and said unrestrained preselected card is moved to a physically discrete position relative to the remainder of cards within said deck,
means adjacent the other of said partially open sides for receiving said preselected card when moved to said physically discrete position and for completely removing said preselected card from said deck,
compressor fingers insertable through said side wall apertures after said preselected card is removed from said pack,
means for effecting relative movement between said fingers and said file to establish a gap between the last card of said deck and one of said end walls, and
means for inserting said preselected card into said gap.

4. A card selecting apparatus comprising:
a circular drum having a plurality of card receiving compartments located around the periphery thereof, each of said compartments being adapted to receive a deck of coded cards therein,
means including a nozzle located within said drum for directing a gaseous velocity stream toward the periphery of said drum and against the inner edge of a selected deck of cards located at a scanning station,
means at said scanning station for restraining all but a preselected card of said selected deck against movement relative to the remainder of said deck when exposed to said velocity stream,
means mounted adjacent the outer edge of said selected deck at said scanning station for receiving said preselected card when moved relative to the remainder of the cards within said deck by said velocity stream,
means for effecting relative indexing movement between said drum and said scanning station so as to locate a selected deck at said scanning station,
scanning means for moving said drum relative to said nozzle after said selected deck has been located at said scanning station and while a gaseous velocity stream is issuing from said nozzle so as to sequentially expose all of the cards of the single selected deck to said velocity stream, and
the improvement which comprises misalignment compensation means for maintaining said nozzle directed at the inner edge of a card of said selected deck whose outer edge is aligned with said card receiving means as said drum is moved relative to said selected deck by said scanning means, said misalignment compensation means comprising means for moving said nozzle in synchronization with said drum but in a direction opposite the direction of movement of said drum and at a slower rate of angular rotation than said drum so that said nozzle remains directed at the inner edge of a card having its outer edge aligned with said receiving means.

References Cited by the Examiner

UNITED STATES PATENTS

| | | | |
|---|---|---|---|
| 2,644,458 | 7/1953 | Meagher | 129—16.1 |
| 3,052,509 | 9/1962 | Conde-Garriga | 129—16.1 X |
| 3,126,008 | 3/1964 | Geddes | 129—16.1 |
| 3,225,770 | 12/1965 | Lasley et al. | 129—16.1 |
| 3,228,130 | 1/1966 | Novak | 129—16.1 X |

JEROME SCHNALL, *Primary Examiner.*